July 28, 1925.

T. STYAN 1,547,463

GRIP

Filed Sept. 8, 1923

Inventor
Thomas Styan
By Edgar M. Kitchin
His Attorney.

Patented July 28, 1925.

1,547,463

UNITED STATES PATENT OFFICE.

THOMAS STYAN, OF MAYS LANDING, NEW JERSEY, ASSIGNOR TO LOUIS ELY, OF VINELAND, NEW JERSEY.

GRIP.

Application filed September 8, 1923. Serial No. 661,591.

*To all whom it may concern:*

Be it known that I, THOMAS STYAN, a citizen of the United States, residing at Mays Landing, in the county of Atlantic and State of New Jersey, have invented certain new and useful Improvements in Grips; and I do hereby declare the following to be a full, clear, and exact description of the invention, such as will enable others skilled in the art to which it appertains to make and use the same.

This invention relates to improvements in grips for handles, such as the levers of automobile gear shifts and the handle bars of bicycles, and elsewhere where a firm hold is desirable.

An object in view is the provision of a structure affording a firm hold, and at the same time possessing both beauty of appearance and physical capacity for easy, visual observance.

With this and further objects in view as will in part hereinafter become apparent and in part be stated, the invention comprises certain novel constructions, combinations and arrangements of parts as subsequently specified and claimed.

In the accompanying drawings,—

Figure 1:
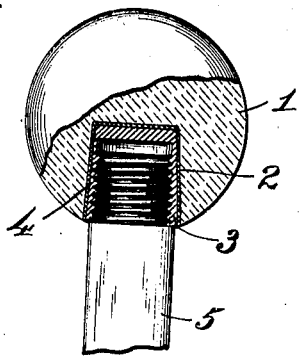
Figure 1 is a sectional elevation of a grip embodying the features of the present invention and shown applied to the gear shift lever of an automobile.
Figure 2:
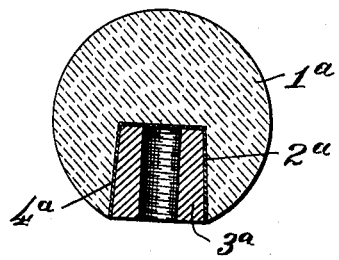
Figure 2 is a transverse section through a similar device, a slight variation in the construction of the socket being shown.
Figure 3:
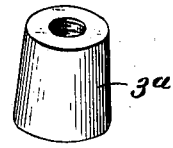
Figure 3 is a detail, perspective view of the socket sleeve detached.

Referring to the drawings by numerals, 1 indicates a globular body formed of opal glass and colored in imitation of onyx or other stone, but possessing sufficient translucence to give the appearance of light, and, accordingly, facilitate observance when sought by the hand of the operator in the dark. The body 1 is formed by being cast from molten glass, and in the operation of casting the body is formed with a depression or recess 2, which is circular in cross section at all points and tapers inwardly to its flat base. Anchored in the recess 2 is a metallic socket 3, which is preferably bonded in place by a cement coating 4 lying between the exterior surface of the metallic socket 3 and the surrounding walls of the recess 2 and effectively anchoring the socket within the ball 1. The metallic sleeve or socket 3 is open at its outer end and closed at its inner end, and formed with internal threads or other appropriate engaging means for connecting the sleeve to a handle, such as the gear shift lever 5. The socket or sleeve 3 has its outer end terminating substantially flush with and continuous of the curvature of the surface of the ball 1. The bore and thread of the sleeve 3 is caused to conform with the thread on the dowel or threaded extension of the lever 5, and varies according to variations in such levers in commercial use. As, for example, there is seen in Figure 2 the globular body or ball 1ª in which is shown the metallic socket or sleeve 3ª cemented at 4ª in the recess 2ª of the body 1ª. The sleeve 3ª is identical with sleeve 3 except that its threaded bore extends entirely throughout the length of the sleeve and is of a diameter less than the diameter of the bore of sleeve 3 so as to enable the grip in this particular instance to fit a lever or handle having a smaller threaded shank from that of the lever 5. Thus, variation in the thickness of the wall of the metallic socket is all that is required to cause the grip to be adapted to any of the various levers commonly on the market.

The utility of the grip is inclusive of the devices named and also of various other articles in other arts where a good, firm hold is required for pulling or shifting parts about, such as bureau drawer handles and the like.

What I claim is:—

1. A grip for gear shifting levers comprising a body of glass, and a metallic socket bonded therein and tapering inwardly.

2. A grip for gear shifting levers comprising a body of cast material having a tapering recess, and a socket of metal of similar taper cemented within the recess.

In testimony whereof I affix my signature in presence of two witnesses.

THOMAS STYAN.

Witnesses:
 EDGAR M. KITCHIN,
 CHRISTIE H. FESLER.